United States Patent
Okamoto et al.

(10) Patent No.: US 7,000,157 B2
(45) Date of Patent: Feb. 14, 2006

(54) DATA TRANSMITTING APPARATUS, DATA TRANSMITTING METHOD, DATA TRANSMITTING PROGRAM AND RECORDING MEDIUM STORED THE SAME

(75) Inventors: Tomoyuki Okamoto, Yao (JP); Takashi Ueda, Kashiba (JP)

(73) Assignee: Minolta Co., Ltd., Osaka (JP)

( * ) Notice: Subject to any disclaimer, the term of this patent is extended or adjusted under 35 U.S.C. 154(b) by 436 days.

(21) Appl. No.: 10/096,876

(22) Filed: Mar. 14, 2002

(65) Prior Publication Data
US 2002/0194553 A1 Dec. 19, 2002

(30) Foreign Application Priority Data
Mar. 30, 2001 (JP) ............................ P2001-100062

(51) Int. Cl.
G01R 31/28 (2006.01)
G06F 15/16 (2006.01)
(52) U.S. Cl. ...................................... 714/712; 709/206
(58) Field of Classification Search ................ 714/699, 714/712, 752, 753, 776, 746, 748, 755; 358/1.15; 709/206
See application file for complete search history.

(56) References Cited

U.S. PATENT DOCUMENTS

| | | | |
|---|---|---|---|
| 6,433,669 B1 * | 8/2002 | Kuramatsu | 340/7.44 |
| 6,437,873 B1 | 8/2002 | Maeda | |
| 6,775,705 B1 * | 8/2004 | Maeda | 709/230 |

2002/0059362 A1  5/2002  Maeda

FOREIGN PATENT DOCUMENTS

| | | |
|---|---|---|
| JP | 5-014469 | 1/1993 |
| JP | 7-105114 | 4/1995 |
| JP | A-10-117198 | 5/1998 |
| JP | 10327261 | 12/1998 |
| JP | 11041275 | 2/1999 |
| JP | 11-65963 | 3/1999 |
| JP | 11127330 | 5/1999 |
| JP | 11-261628 | 9/1999 |
| JP | 11298664 | 10/1999 |
| JP | 2000259514 | 9/2000 |

* cited by examiner

Primary Examiner—Joseph Torres
Assistant Examiner—James C. Kerveros
(74) Attorney, Agent, or Firm—Buchanan Ingersoll PC

(57) ABSTRACT

An object of the invention is to effectively prevent erroneous transmission data from being repeatedly transmitted at the time of transmitting data. At the time of data transmission, the user designates a transmission destination from a transmission destination registration table (D1) in a storing unit (23). To achieve the object, a display control unit (313) determines whether or not error information is associated with the designated transmission destination in the transmission destination registration table (D1). If the error information is associated, an error notification is displayed on a display (12) to notify the user of the occurrence of the error and to stimulate the user to counter the error. When the data transmitting apparatus (1) receives an E-mail, an error determining unit (314) determines whether the E-mail is an error mail or not. If it is an error mail, error information is added to the transmission destination registration table (D1).

16 Claims, 9 Drawing Sheets

F I G . 3
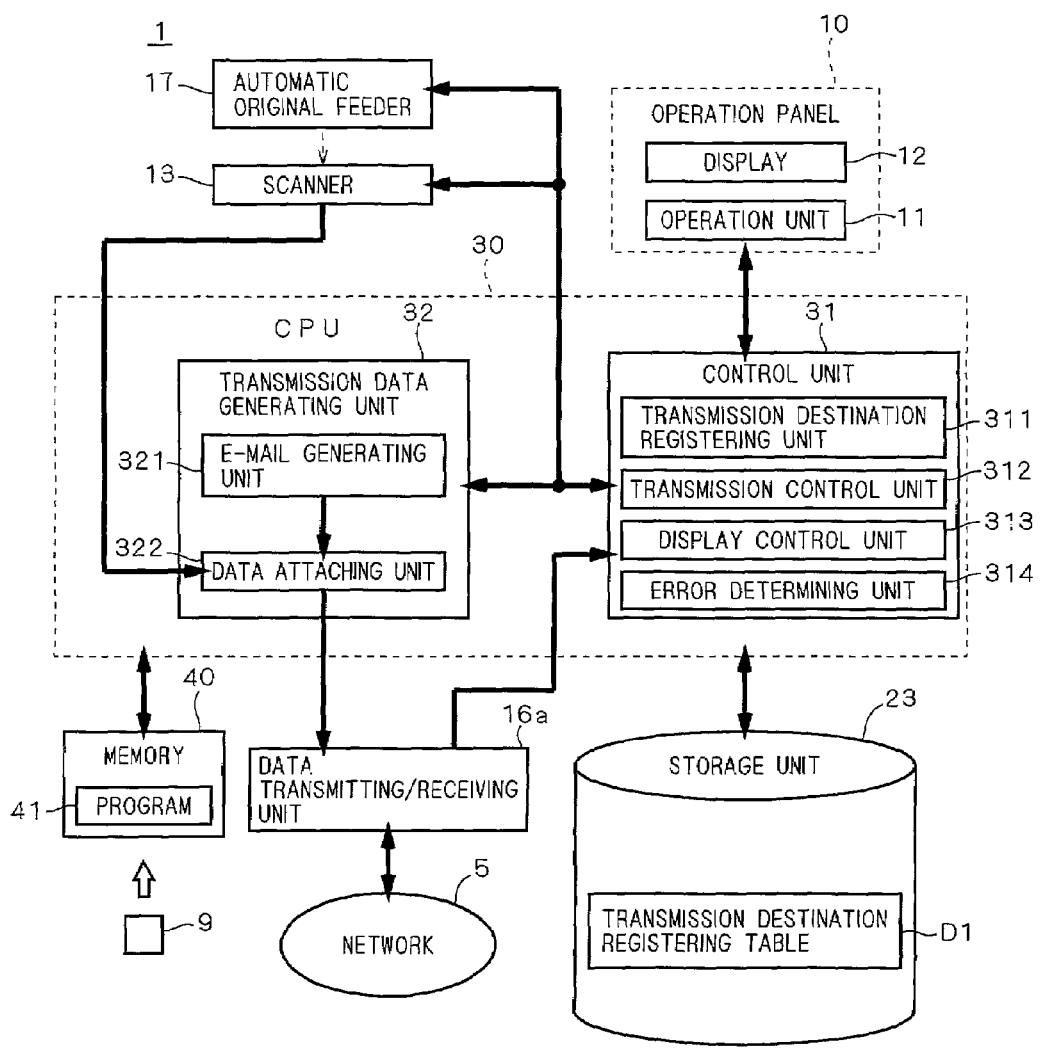

FIG. 8

```
50
51 → Date:Wed, 25 Jan 2001 10:30:42 +0900
52 → To: tanaka@aaa.com
53 → From: MFP001@aaa.com
        .
        .
        .
54 → Message-ID: <S200101250002>
        .
        .
        .
```

FIG. 9

```
60
61 → Date:Wed, 25 Jan 2001 10:30:52 +0900
62 → To: MFP001@aaa.com
63 → From: MAILSERVER@aaa.com
        .
        .
        .
64 → Original-Message-ID: <S200101250002>
65 → ERROR-address not found
```

FIG. 10

```
71 ── Date:Wed, 25 Jan 2001 10:30:52 +0900
72 ── To: MFP001@aaa.com
73 ── From: tanaka@aaa.com
          .
          .
          .
74 ── Original-Message-ID: <S200101250002>
75 ── ERROR-resolution error
```

60

DATA TRANSMITTING APPARATUS, DATA TRANSMITTING METHOD, DATA TRANSMITTING PROGRAM AND RECORDING MEDIUM STORED THE SAME

This application is based on application No. 2001-100062 filed in Japan, the contents of which are hereby incorporated by reference.

BACKGROUND OF THE INVENTION

1. Field of the Invention

The present invention relates to a data transmitting technique for transmitting data.

2. Description of the Background Art

Conventionally, as data transmitting apparatuses, a facsimile apparatus for transmitting image data via a public telephone line, a personal computer as an electronic mail (E-mail) terminal, and the like are used. Recently, a facsimile apparatus having what is called an Internet facsimile function of transmitting image data attached to an E-mail is also provided.

Each of the data transmitting apparatuses generally has a data table in which information for specifying a data transmission destination (for example, facsimile number or an E-mail address) is pre-registered (hereinbelow, called "transmission destination registration table"), and the user can designate a transmission destination of data by using the transmission destination information registered in the data table. Concretely, the transmission destination information registered in the transmission destination registration table is assigned to operation keys provided for an operation unit of the apparatus and the transmission destination can be designated by depressing a predetermined operation key (so-called one-touch key or abbreviated dialing), or the transmission destination information registered in the transmission destination registration table is displayed in the form of a list, and a desired transmission destination is selected from the list, thereby enabling the transmission destination to be designated.

In the personal computer or the facsimile apparatus having the Internet facsimile function, transmission conditions such as resolution and format (image format) of image data to be transmitted can be optionally set. Further, there is also provided a data transmission apparatus in which the transmission conditions are registered in the transmission destination registration table in association with the transmission destinations and set as default values of the transmission conditions at the time of data transmission.

In the data transmitting apparatus having the transmission destination registration table, if there is an error in the transmission destination information registered in the transmission destination registration table, it causes a situation such that a transmission error occurs due to an unknown transmission destination in the data transmission using the transmission destination information. In the conventional data transmitting apparatus, however, even in the case where a transmission error occurs, since the user intending to transmit data next time cannot know the presence of the transmission error, it causes a problem such that the transmission error occurs again and again.

In the data transmitting apparatus in which the transmission condition can be set, also in the case where E-mail software installed on an apparatus on the data reception side or the apparatus itself is not adapted to the resolution or format of image data which has been set, a transmission error occurs. Further, in the case where the transmission conditions are registered in the transmission destination registration table, when the transmission conditions registered in the transmission destination registration table as default values of the transmission conditions include a condition which is not adapted to the reception side, there is also a problem such that the transmission error occurs again and again.

SUMMARY OF THE INVENTION

According to the invention, there is provided a data transmitting apparatus comprising: a storing unit for storing at least one transmission destination; a transmitting unit for transmitting data to a designated transmission destination; an error information storing unit, when an error occurs in data transmission performed by the transmitting unit, for storing error information indicative of occurrence of the error as to be associated with the designated transmission destination into the storing unit; and a notification control unit, when a predetermined operation is performed by a user on the transmission destination stored in the storing unit, for checking whether the error information exists or not by referring to the storing unit and, if the error information exits, notifying of an error occurrence notification with respect to the transmission destination associated with the error information.

According to the invention, when an error occurs in data transmission performed by the transmitting unit, error information indicative of occurrence of the error is stored so as to be associated with the designated transmission destination into the storing unit. When a predetermined operation is performed by the user on the transmission destination stored in the storing unit, the presence or absence of the error information is checked by referring to the storing unit and, if the error information exits, occurrence of an error with respect to the transmission destination associated with the error information is notified. Consequently, at the time of transmitting data, it can be effectively prevented that transmission data having the high possibility of occurrence of an error is repeatedly transmitted.

In an aspect of the invention, the predetermined operation is an operation of selecting the designated transmission destination from the transmission destination stored in the storing unit, and the notification control unit notifies of the error occurrence notification when the error information is associated with the designated transmission destination selected by the predetermined operation.

According to the aspect, when the error information is associated with the transmission destination selected by the operation of selecting a transmission destination of data from the transmission destinations stored in the storing unit, the occurrence of the error is notified. Thus, the error occurrence can be notified at a stage before transmission data having the high possibility of occurrence of an error is transmitted to the selected transmission destination.

In another aspect of the invention, the predetermined operation is an operation for displaying data stored in the storing unit.

According to the aspect, in the case where the operation for displaying the data stored in the storing unit is performed, the presence or absence of error information is checked with reference to the storing unit and, if the error information exists, the occurrence of the error is notified with respect to the transmission destination associated with the error information. Thus, even in the case where the transmission destination associated with the error information is not designated, the existence of the error can be notified to the user.

In another aspect of the invention, the notification control unit also notifies the user of an error treatment notification with respect to the transmission destination associated with the error information so as to stimulate the user to settle the error.

According to the aspect, the treatment to the error with respect to the transmission destination associated with the error information is also notified to the user so as to stimulate the user to settle the error. Consequently, the notification can be sent to the user more effectively.

In further another aspect of the invention, the data transmitting apparatus further includes a display unit for displaying the error occurrence notification and the error treatment notification.

According to the aspect, since the data transmitting apparatus further includes a display unit for displaying the error occurrence notification and the error treatment notification, the user can visually recognize the occurrence of the error and necessity of settling the error.

In further another aspect of the invention, the notification control unit changes an information displayed on the display unit in accordance with a kind of the error corresponding to the error information.

According to the aspect, since the information displayed on the display unit is changed according to the kind of an error corresponding to the error information, the user can take a proper treatment in accordance with the kind of the error.

In further another aspect of the invention, when the kind of the error is the error regarding a transmission destination, the designated notification control unit displays an information for stimulating the user to confirm contents stored in the storing unit with regard to the transmission destination corresponding to the kind of the error onto the display unit.

According to the aspect, when the kind of the error is an error regarding the transmission destination, the information for stimulating the user to confirm the stored transmission destination corresponding to the kind of the error is displayed. Consequently, the user can recognize that there is the possibility that the transmission destination stored is erroneous.

In further another aspect of the invention, when the kind of the error is an error regarding transmission data, the notification control unit displays an information for stimulating the user to review a capacity or format of data to be transmitted onto the display unit.

According to the aspect, when the kind of the error is an error regarding transmission data, the message for stimulating the user to review a capacity or format of data to be transmitted is displayed. Therefore, the user can recognize that there is the possibility that the capacity or format of the data to be transmitted is erroneous.

The present invention is also directed to a data transmitting method, a computer program to be read and executed by a computer, and a computer software product.

As described above, the object of the present invention is to realize the technique capable of effectively preventing that a transmission error occurs again and again even if there is a mistake in registered information at the time of transmitting data by using the transmission destination information and transmission conditions registered in the transmission destination registration table.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing a detailed functional configuration of the data transmitting apparatus;

FIG. 8 is a diagram showing an example of a header of E-mail data;

FIG. 9 is a diagram showing an example of an error mail from a mail server;

FIG. 10 is a diagram showing an example of an error mail from an apparatus at a transmission destination;

DESCRIPTION OF PREFERRED EMBODIMENTS

Preferred embodiments of the invention will be described in detail hereinbelow with reference to the drawings.

<1. General Configuration of Data Transmitting Apparatus>

Figure 1:
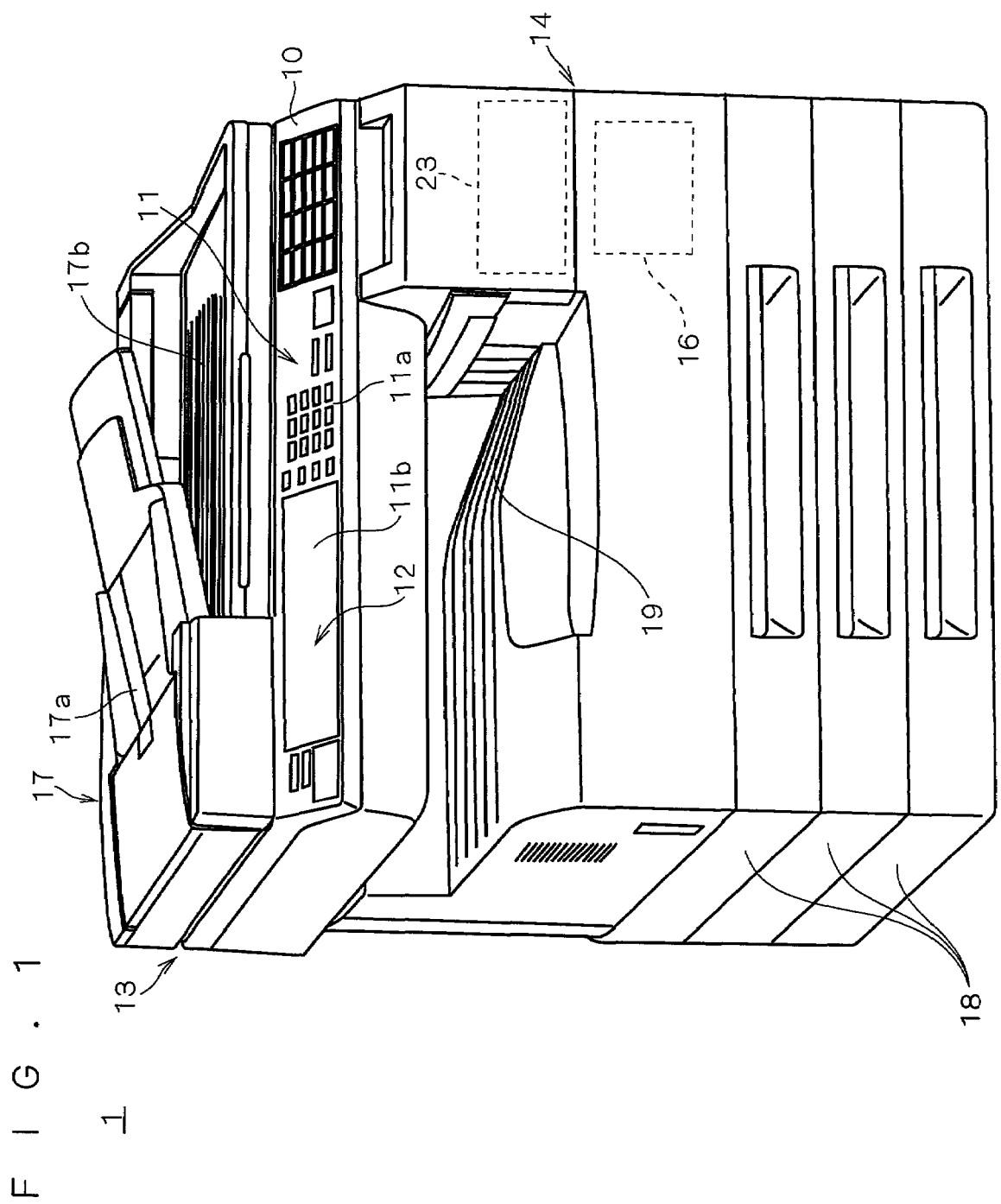
FIG. 1 is an external view of a data transmitting apparatus in a preferred embodiment of the invention.

FIG. 1 is an external view of a data transmitting apparatus 1 in the preferred embodiment. In the preferred embodiment, the data transmission apparatus 1 is an apparatus called a multifunctional peripheral (MFP) which is a composite apparatus having the functions of a scanner, copier, printer, facsimile, and the like. The data transmitting apparatus 1 is so configured as to transmit/receive facsimile data (image data related to the contents to be transmitted) by using the E-mail function and can transmit/receive data via a network such as an LAN and the Internet. The data transmitting apparatus 1 further has the function of the Group III facsimile and can transmit/receive facsimile data in conformity with the conventional facsimile standard via a public telephone line or the like.

The data transmitting apparatus 1 has, as shown in FIG. 1, an operation unit 11 including a plurality of keys 11a and a touch panel sensor 11b, for receiving various instructions by the operation of the user and data such as characters, numerals, and the like, a display 12 for displaying an instruction menu for the user, information regarding an image acquired, and so on, a scanner 13 for photoelectrically reading an original to obtain image data, and a printer 14 for printing an image onto a recording sheet on the basis of the image data.

On top of the body of the data transmitting apparatus 1, an automatic original feeder (feeder) 17 for feeding an original to the scanner 13 is provided. In the lower part of the apparatus, a sheet feeding unit 18 for supplying a recording sheet to the printer 14 is provided. In the center part, a tray 19 to which the recording sheet on which an image is printed by the printer 14 is ejected is provided. Provided on the inside are a communication unit 16 for transmitting/receiving image data and the like to/from an external device via a network and a storing unit 23 taking the form of a memory, a magnetic disk, or the like for storing the image data, information of various tables which will be described hereinlater, and the like. Although not shown, the data transmitting apparatus 1 has an interface for connection to a network such as an LAN or the Internet or a public telephone line. The communication unit 16 is connected to the network, public telephone line, or the like via the interface so as to transmit/receive various data to/from an external device.

At the time of designating a transmission destination to which image data or the like obtained by reading an original is transmitted, the display 12 displays a list of E-mail addresses (transmission destination addresses) as a transmission destination list. In the case where an error has occurred when data was transmitted to a designated transmission destination, a screen for notifying the user of the error is displayed on the display 12. A setup screen for setting transmission conditions such as a scan condition and a condition of transmission data, or the like is also displayed on the display 12. On the surface side of the display 12, the touch panel sensor 11b is provided to facilitate the operation of the user to designate a transmission destination address at the time of data transmission and deal with an error display. The operation unit 11 including the plurality of keys 11a and the touch panel sensor 11b is used for various inputs including an operation of designating a transmission destination and the error operation by the user. The operation unit 11 and display 12 function as an operation panel 10 as a main part of the user interface.

The scanner 13 functions as a reader for reading an original, photoelectrically reads image information of photograph, characters, picture, or the like from an original to generate image data. The image data obtained by reading an original is subjected to known various image processes and image conversion to obtain image data in a data format designated by the user or a predetermined data format. After that, the resultant is sent to the printer 14 or communication unit 16 so as to be printed or transmitted. In the case of transmitting the data of the read image (hereinbelow, called "scan transmission"), the image data is processed as an attachment to an E-mail, sent to the communication unit 16, and transmitted to a designated transmission destination via a network or the like. In order to prepare for a case of re-using image data obtained by reading later, the image data can be stored in the storing unit 23.

The printer 14 prints an image onto a recording sheet on the basis of image data obtained by the scanner 13, image data received from an external device via the communication unit 16, or image data stored in the storing unit 23.

The communication unit 16 transmits/receives facsimile data via a communication network such as a public telephone line and also transmits/receives image data by using an E-mail or the like via a network such as an LAN to/from an external device connected to the network. Consequently, the data transmitting apparatus 1 has not only the function of the facsimile apparatus for performing normal facsimile communication but also the function of a transmission/reception terminal of an E-mail. The data transmitting apparatus 1 therefore can transmit/receive various image data as a file attached to an E-mail and function as what is called an Internet facsimile apparatus. A network communication performed by the data transmitting apparatus 1 may be either wired or wireless.

The automatic original feeder 17 is an apparatus for automatically feeding originals placed on an original placement part 17a one by one. The originals read by the scanner 13 are sequentially piled up on an ejection part 17b.

Figure 2:
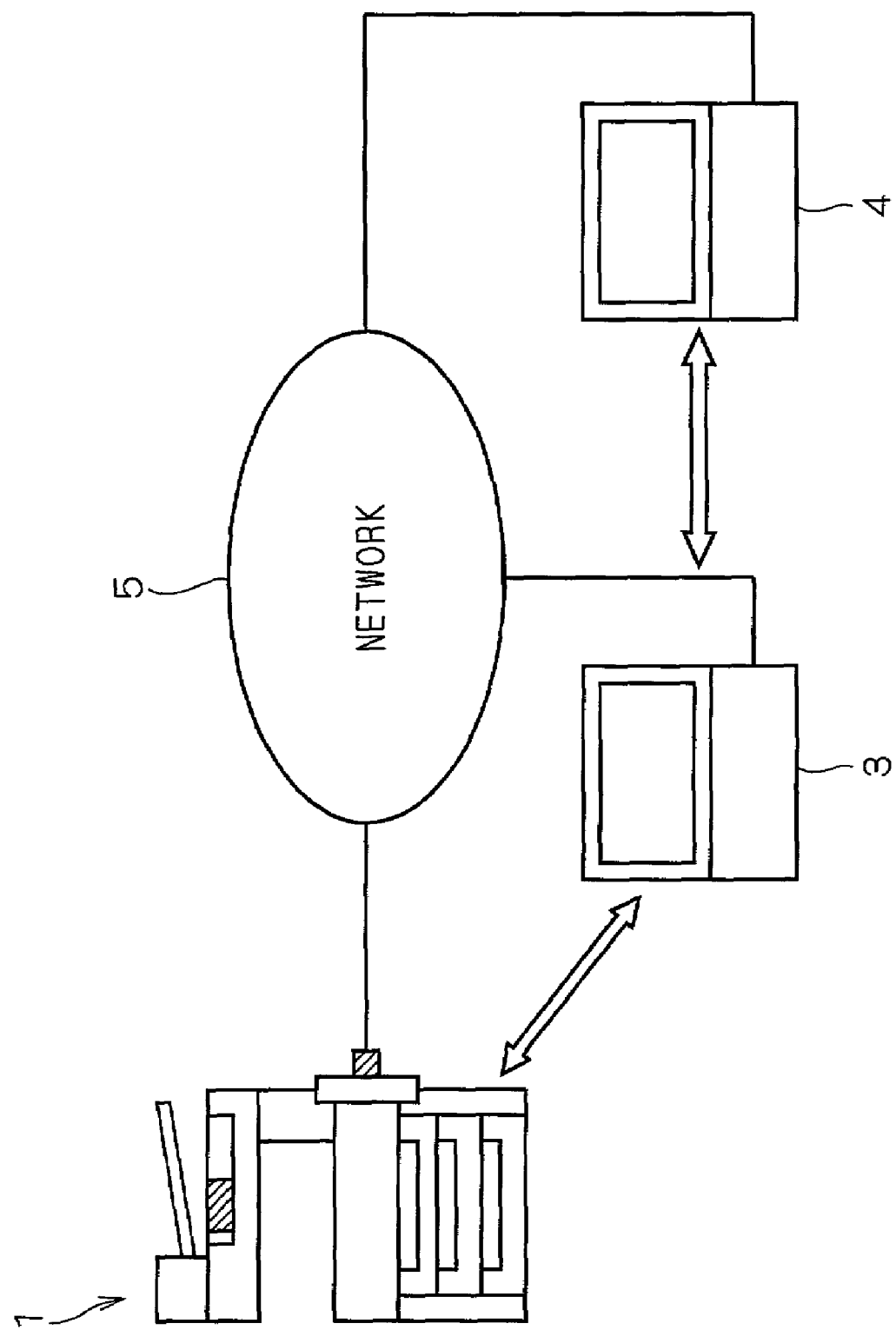
FIG. 2 is a diagram showing a system configuration used for the data transmitting apparatus to transmit/receive data by using an E-mail function.

FIG. 2 is a diagram showing the system configuration used for the data transmitting apparatus 1 to transfer/receive data by using the E-mail function and illustrates a case where data is transmitted/received between the data transmitting apparatus 1 and a computer 4 via a mail server 3.

As shown in FIG. 2, the system is constructed by connecting each of the data transmitting apparatus 1 as a data transmission source (transmission side of image data), the computer 4 as a data transmission destination (reception side of image data), and the mail server 3 as a relay of data communication to a network 5. Although FIG. 2 illustrates the case where the data transmission destination is the computer 4, the invention is not limited to the case but the data transmission destination may be a data transmitting apparatus having a configuration similar to the above-described configuration or may be another apparatus.

At the time of transmitting image data obtained by reading an original to the computer 4 as a transmission destination, the data transmitting apparatus 1 can attach the image data to an E-mail and transmits the resultant. In this case, an E-mail address associated with the computer 4 is designated by the user and the data transmitting apparatus 1 transmits the E-mail to the designated E-mail address as a transmission destination. The E-mail is supplied to the mail server 3 via the network 5 and stored in the storing unit in the mail server 3.

The computer 4 as a transmission destination accesses the mail server 3 on the network 5 every predetermined time set as a mail acquisition interval to automatically check whether an E-mail addressed to itself exists in the mail server 3 or not. When an E-mail addressed to itself exists, the computer 4 takes the E-mail in. In other words, when the computer 4 takes the E-mail in, it means that the E-mail data transmitted from the data transmitting apparatus 1 reaches the transmission destination.

The mail server 3 stores the data input from the data transmitting apparatus 1 into the storing unit such as a magnetic disk or the like. When the computer 4 accesses the mail server 3, the mail server 3 transmits an E-mail of which transmission destination is designated as the computer 4 to the computer 4.

When the E-mail address designated as the transmission destination of an E-mail input from the data transmitting apparatus 1 does not exist, the mail server 3 automatically returns an error mail to the data transmitting apparatus 1 as a transmission source of the E-mail.

Further, when an E-mail is received, E-mail software installed in the computer 4 allows the computer 4 to function so as to analyze the image data attached to the E-mail and discriminate whether the image data can be processed by the computer 4 or not. For example, when the data format which can be processed by the computer 4 is a bit map image expressed by 16 bits, even if a bit map image expressed by 24 bits or 32 bits is received, the bit map image cannot be normally processed. The following cases can be also considered; a case where image data is generated at a resolution higher than a resolution at which the computer 4 can perform a process, a case where a data capacity exceeds a data capacity which can be processed by the computer 4, a case where image data is compressed by a compression method and cannot be decompressed by the computer 4, and so on. Consequently, the image data attached to the E-mail is discriminated whether it can be processed or not and if it cannot be processed, the computer 4 transmits an error mail to the data transmitting apparatus 1. The computer 4 similarly transmits an error mail in the case where the E-mail software installed in the computer 4 is not adapted to the format or resolution of image data attached to an E-mail.

In the preferred embodiment, the data transmitting apparatus 1 stores at least one E-mail address as a transmission destination in the storing unit 23. In the case where image data is transmitted by using an E-mail to the transmission destination designated by the user and, after that, the error mail is received, error information indicated by the error mail is stored in the storing unit 23 so as to be associated with the designated transmission destination. When the user tries to send image data to the transmission destination with which the error information is associated, the data transmitting apparatus 1 notifies the user of occurrence of an error and a request to deal with the error.

The details of the function and operation of such a data transmitting apparatus 1 will be described hereinbelow.

<2. Function and Operation of Data Transmitting Apparatus>

FIG. 3 is a block diagram showing the detailed functional configuration of the data transmitting apparatus 1. As shown in FIG. 3, the data transmitting apparatus 1 has therein a CPU 30 for reading a program 41 stored in a memory 40 and executing it, thereby making the CPU 30 function as a control unit 31 and a transmission data generating unit 32. The CPU 30 can access the storing unit 23.

On the basis of input information set by the user via the operation panel 10 including the operation unit 11 and display 12, the control unit 31 controls the automatic original feeder 17 and scanner 13 at the time of scan transmission and makes the transmission data generating unit 32 function. The control unit 31 controls a data transmitting/receiving unit 16a included in the communication unit 16 to control transmission/reception of the E-mail data via the network 5.

When the control unit 31 periodically accesses the mail server 3 every preset period (reception interval) to check whether there is an E-mail addressed to itself or not and the presence of an E-mail is confirmed, the E-mail is received via the data transmitting/receiving unit 16a.

The control unit 31 further functions as a transmission destination registering unit 311, transmission control unit 312, display control unit 313, and error determining unit 314.

The transmission destination registering unit 311 registers an E-mail address of a new transmission destination entered by the user to the operation panel 10 into a transmission destination registration table D1 in the storing unit 23. When the user enters the transmission conditions of image data and the like on a destination-by-destination basis, the transmission destination registering unit 311 registers transmission condition registration information so as to be associated with a transmission destination into the transmission destination registration table D1.

The transmission control unit 312 controls so that the automatic original feeder 17 and scanner 13 synchronously operate at the time of scan transmission, and makes the transmission data generating unit 32 function to generate transmission data in the form of an E-mail to be transmitted to a designated transmission destination and transmit the E-mail to the transmission destination via the data transmitting/receiving unit 16a. When the transmission condition registration information is registered in association with the designated transmission destination, the transmission control unit 312 controls the scanner 13 and transmission data generating unit 32 on the basis of the transmission condition registration information, thereby generating image data according to the transmission condition registration information.

The transmission control unit 312 periodically accesses the mail server 3 every reception interval at the time of data reception to check whether E-mail data addressed to itself exists or not. If the E-mail data exists, the transmission control unit 312 performs a control to receive the E-mail data from the mail server 3.

The display control unit 313 controls the contents of a display screen on the display 12. When the user designates a transmission destination, a list of the transmission destinations from the transmission destination registration table D1 is displayed on the display 12. In such a manner, the operation of designating the transmission destinations by the user is performed easily. When the user designates the transmission destination, the display control unit 313 retrieves and determines whether error information is associated with the transmission destination designated in the transmission destination registration table D1. If the error information is associated, an error notification screen is displayed on the display 12 on the basis of the error information. Thus, the display control unit 313 also functions as a notification control unit for notifying of occurrence of an error with respect to the transmission destination with which the error information is associated.

The error determining unit 314 determines whether an E-mail received is an error mail or not. When the E-mail is an error mail, the error determining unit 314 functions as an error information storing unit for storing the error information in association with the transmission destination to the transmission destination registration table D1 in the storing unit 23.

The transmission data generating unit 32 also functions as an E-mail generating unit 321 and a data attaching unit 322. The E-mail generating unit 321 is constructed to automatically generate E-mail data to the transmission destination designated by the user from the operation panel 10. The E-mail data generated by the E-mail generating unit 321 includes an E-mail address for specifying the transmission destination and a message ID as peculiar identification information. The data attaching unit 322 is constructed to perform a process of automatically attaching image data obtained by reading an original to the E-mail generated by the E-mail generating unit 321. E-mail data for transmitting data to the transmission destination is generated by the process of attaching the image data. By attaching the image data to the E-mail, arbitrary image data can be transmitted to the transmission destination by using the E-mail.

The program 41 executed by the CPU 30 may be pre-stored in the memory 40 or the program 41 stored in a computer-readable recording medium 9 such as a memory card may be stored into the memory 40 under the control of the CPU 30. The CPU 30 may store data regarding the program 41 input from the computer 4 via the network 5 into the memory 40. Further, the CPU 30 may directly read the program 41 stored in the recording medium 9 or the program 41 input via the network 5 without using the memory 40 and execute the read program 41.

On the other hand, the storing unit 23 stores, in addition to image data to be stored and the like, the transmission destination registration table D1. The transmission destination registration table D1 is table information in which at least one E-mail address regarding the transmission destination of an E-mail is registered and stores name of the transmission destination, E-mail address of the transmission destination, transmission condition registration information associated with the transmission destination, and error information associated with the transmission destination. The transmission destination registration table D1 is managed, for example, as table data as follows.

TABLE 1

| Number | Name | E-mail address | Transmission condition registration information | Error information |
|---|---|---|---|---|
| 1 | Tanaka | tanaka@aaa.com | A4,600 dpi, bmp | Address error |
| 2 | Sato | sato@bbb.com | A4,1200 dpi, JPEG | Resolution error |
| 3 | Suzuki | suzuki@ccc.com | B4,600 dpi, bmp | Format error |
| 4 | Kimura | kimura@ccc.com | — | — |
| 5 | Yamada | yamada@aaa.com | JPEG | Compression method error |
| . | . | . | . | . |
| . | . | . | . | . |

As shown in Table 1, the transmission destination registration table D1 includes items of numbers assigned in accordance with the order of registration, name of the transmission destination, E-mail address of the transmission destination, transmission condition registration information, and error information. When a transmission destination is newly registered, the name and E-mail address are registered in the table.

As the transmission condition registration information of the transmission destination registration table D1, transmission conditions of image data of each transmission destination can be registered. For example, transmission condition registration information of the name "Tanaka"0 indicates that an A4 original is read at a resolution of 600 dpi and transmitted as image data of a bit map format. Therefore, by registering transmission conditions which can be processed at the transmission destination in the transmission condition registration information, when the user designates a transmission destination, the control unit 31 can automatically set read conditions of the scanner 13 and the like in a state adapted to an apparatus at the transmission destination, so that the burden on the setting operation of the user can be lessened.

In the item of error information, when an error mail is received, information indicative of the kind of the error is stored. In the transmission destination registration table D1 of Table 1, the error information is stored for four transmission destinations and is of different kinds. For example, the error information corresponding to the transmission destination of number 1 is added in response to an error mail transmitted from the mail server 3 and is an address error indicating that information regarding the transmission destination (for example, E-mail address indicative of the transmission destination) has an error. The other error information is added in response to an error mail sent from the computer 4 as a transmission destination and indicates that there is an error in the transmitted image data. The kinds of error information received from the computer 4 include, for instance, a resolution error (data capacity error), a format error, and a compression method error of image data.

In Table 1, "-" is displayed in each of columns in which the transmission condition registration information and error information are not registered.

At the time of transmitting image data from the data transmitting apparatus 1, the user sets an original on the original placement part 17a of the automatic original feeder 17 and designates an E-mail address as a transmission destination from the operation panel 10. At this time, the control unit 31 functions as a display control unit 313, reads the transmission destination registration table D1 stored in the storing unit 23, and displays a list of the transmission destinations registered on the display 12. When an E-mail address corresponding to a desired transmission destination exists in the displayed list, the user selects and designates it. The display control unit 313 determines whether or not error information is stored in association with the selected and designated transmission destination. If the error information is stored, the display control unit 313 displays, on the display 12, an error occurrence notification for notifying the user of the occurrence of an error in the designated transmission destination and an error treatment notification for stimulating the user to settle the error.

FIGS. 4 to 7 are diagrams each showing an example of an error screen displayed on the display 12.

Figure 4:
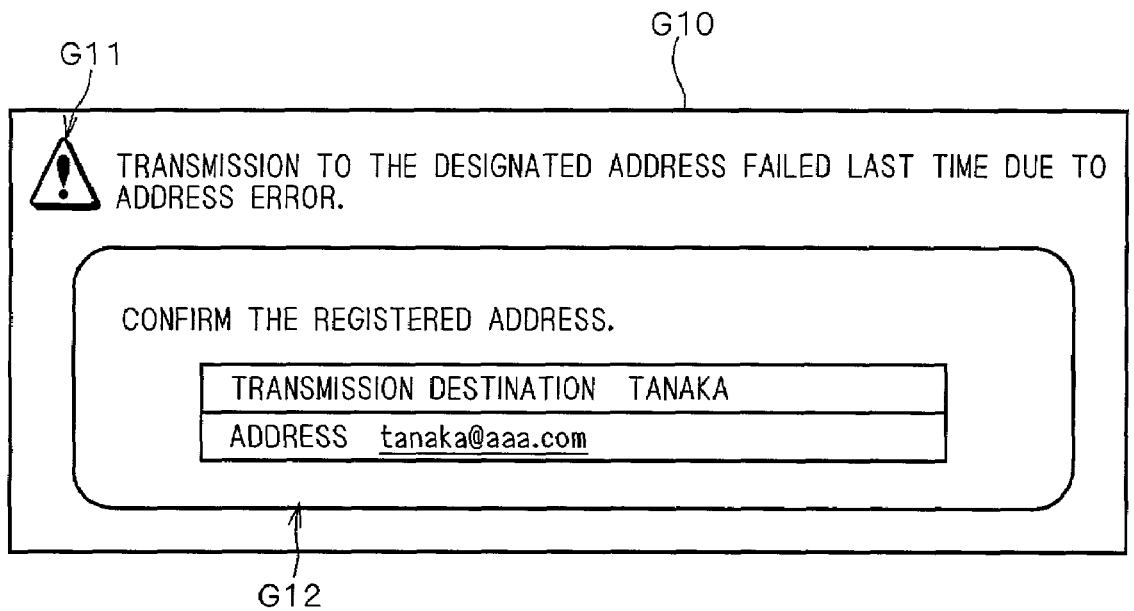
FIG. 4 is a diagram showing an example of an error screen displayed on a display.

First, FIG. 4 shows an error screen G10 regarding an address error, which is an error screen displayed when the user selects the name of "Tanaka"as a transmission destination and the E-mail address "tanaka@aaa.com" from the transmission destination registration table D1 of Table 1. As shown in FIG. 4, when the error information regarding the transmission destination is stored in association with the designated transmission destination, an error occurrence notification G11 indicating that an E-mail sent last time failed due to an unknown transmission destination is displayed, and a message G12 for stimulating the user to confirm the contents of registration is displayed due to the possibility of an error in the registered E-mail address of the transmission destination.

The user can recognize the occurrence of an error by referring to the error screen G10 as shown in FIG. 4 and can easily check whether there is an error in the data registered in the transmission destination registration table D1. By performing a correcting operation with the operation panel 10, the E-mail address can be easily corrected to an accurate address. In the case where the correcting operation is performed by the user, the control unit 31 reflects and updates the corrected data in the transmission destination registration table D1, and eliminates the error information to update the transmission destination registration table D1.

Figure 5:
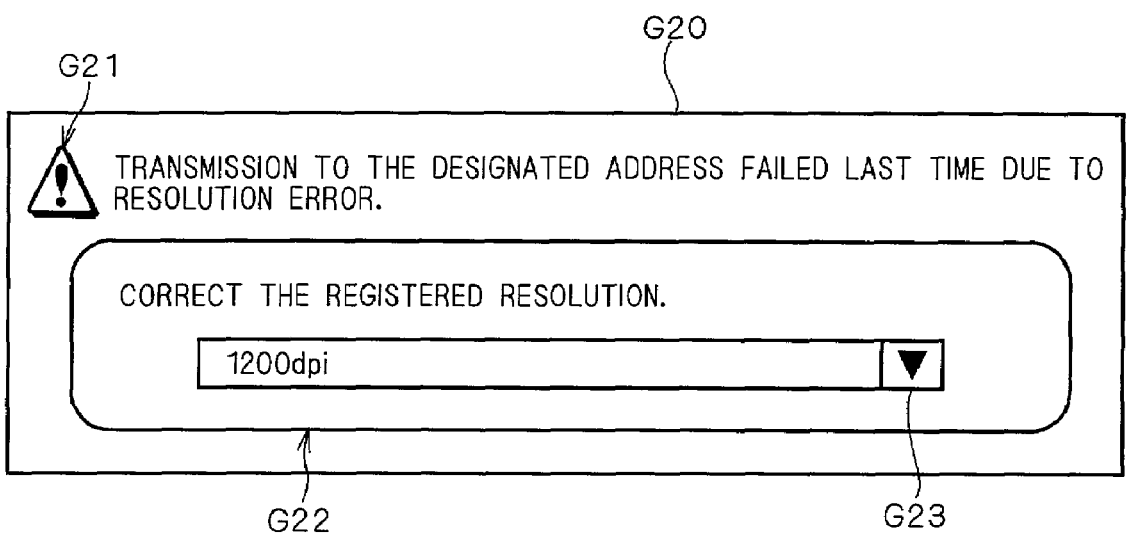
FIG. 5 is a diagram showing another example of the error screen displayed on the display.

FIG. 5 shows an error screen G20 regarding a resolution error, which is displayed when the user selects the name of "Sato" and the E-mail address of "sato@bbb.com as a transmission destination, from the transmission destination registration table D1 of Table 1.

As shown in FIG. 5, in the case where information regarding a resolution error among errors regarding image data is stored in association with the designated transmission destination, an error occurrence notification G21 indicating that an E-mail transmitted last time failed due to the resolution error is displayed. The resolution error occurs, for example, in a case where image data is generated at a resolution higher than the resolution at which the computer 4 as a transmission destination can process the image data, a case where the data capacity exceeds the data capacity which can be processed by the computer 4, or and the like. By the error occurrence notification G21, the user can visually recognize that the apparatus as a transmission destination cannot perform a proper process at a resolution registered in the transmission destination registration table D1.

A message G22 is displayed to stimulate the user to correct the resolution as the cause of the error on the error screen G20 of FIG. 5. The user clicks a list display button G23 on the screen, thereby displaying the list of read resolutions which can be set to the scanner 13. By selecting a proper resolution from the list, the user can easily correct the resolution registered in the transmission destination registration table D1 to a value realizing the proper data capacity. In the case where the correcting operation is performed by the user, the control unit 31 updates the corrected resolution so as to be reflected in the transmission destination registration table D1.

Figure 6:
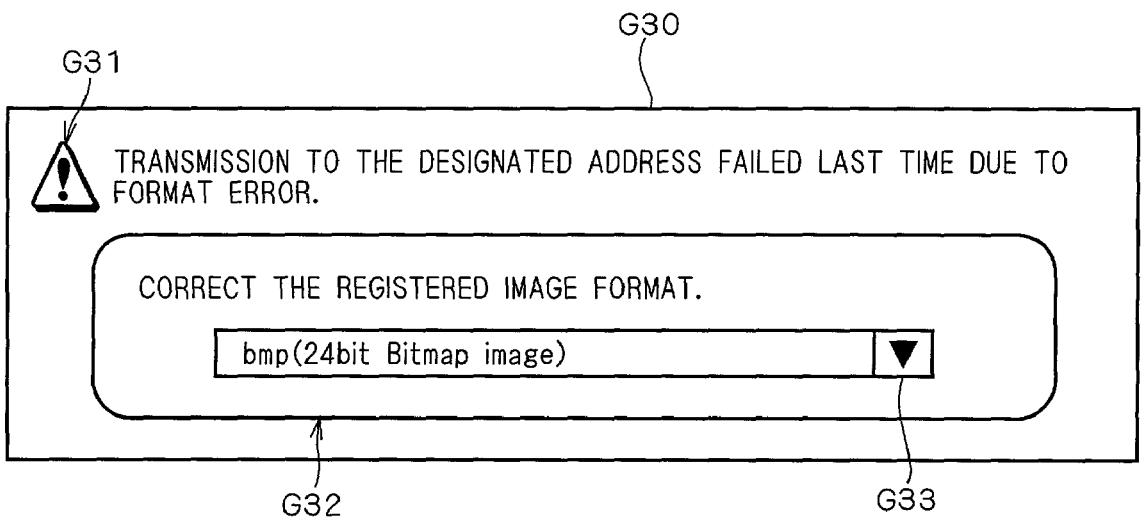
FIG. 6 is a diagram showing another example of the error screen displayed on the display.

FIG. 6 shows an error screen G30 regarding a format error, which is displayed when the user selects the name of "Suzuki" as a transmission destination and the E-mail address of "suzuki@ccc.com" from the transmission destination registration table D1 of Table 1. As shown in FIG. 6, when information regarding the format error among the errors regarding image data is stored in association with the designated transmission destination, an error occurrence notification G31 indicating that an E-mail transmitted last time failed due to the format error is displayed. Consequently, the user can visually recognize that an apparatus at the transmission destination cannot process the image data in the data format registered in the transmission destination registration table D1.

On the error screen G30 of FIG. 6, a message G32 for stimulating the user to correct the data format as the cause of the error is displayed on the error screen G30 of FIG. 6. The user clicks a list display button G33 on the screen, thereby displaying the list of data formats which can be set in the scanner 13. By selecting a proper data format from the list, the data format registered in the transmission destination registration table D1 can be easily corrected to a proper value. When the correcting operation is performed by the user, the control unit 31 updates the data format corrected so as to be reflected in the transmission destination registration table D1.

Figure 7:
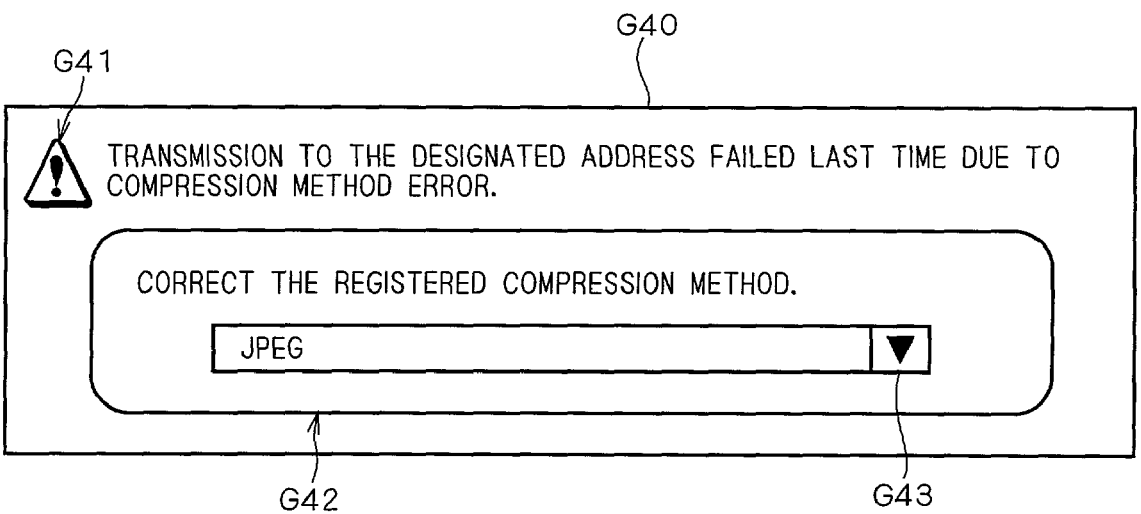
FIG. 7 is a diagram showing another example of the error screen displayed on the display.

FIG. 7 shows an error screen G40 regarding a compression method error, which is displayed when the user selects the name of "Yamada" as a transmission destination and the E-mail address of "yamada@aaa.com" from the transmission destination registration table D1 of Table 1. As shown in FIG. 7, when information of the compression method error among the errors regarding image data is stored in association with the designated transmission destination, an error occurrence notification G41 indicating that an E-mail transmitted last time failed due to the compression method error is displayed. Consequently, the user can visually recognize that an apparatus at the transmission destination cannot process the image data when the image data is compressed by the compression method registered in the transmission destination registration table D1.

On the error screen G40 of FIG. 7, a message G42 for stimulating the user to correct the compression method as the cause of the error is displayed. The user clicks a list display button G43 on the screen, thereby displaying the list of compression methods which can be set in the scanner 13. By selecting a proper compression method from the list, the compression method registered in the transmission destination registration table D1 can be easily corrected to a proper compression method. When the correcting operation is performed by the user, the control unit 31 updates the compression method corrected so as to be reflected in the transmission destination registration table D1.

When the user designates a transmission destination and error information is associated with the designated transmission destination, by displaying an error screen according to the kind of the error information as shown in FIGS. 4 to 7, the error can be properly dealt with in accordance with the kind of the error at the stage before the data transmission. Specifically, in the case where data is transmitted to the designated transmission destination and an error occurs, it is constructed so that when the same transmission destination is designated next time, an error is notified. Consequently, the situation such that an E-mail having high possibility of occurrence of an error is repeatedly transmitted can be prevented.

After completion of the operation of designating the transmission destination and correcting information as the cause of an error, the user instructs a scan start by using the operation panel 10. When the scan start is instructed, the control unit 31 sets scan conditions, operation mode, and the like based on the transmission condition registration information to the scanner 13, makes the automatic original feeder 17 and the scanner 13 operate simultaneously, and controls the scanner 13 to automatically read originals one by one, which are fed from the automatic original feeder 17.

On the basis of the conditions set by the control unit 31, the scanner 13 reads the originals one by one, generates image data in the designated data format, and compresses the image data by the designated compression method. The image data obtained as a result is supplied to the data attaching unit 322 in the transmission data generating unit 32.

The control unit 31 makes the E-mail generating unit 321 in the transmission data generating unit 32 function to automatically generate E-mail data to the transmission destination designated by the user. At this time, the E-mail generating unit 321 generates peculiar message identification information (message ID) and adds it as the header of the E-mail data. The control unit 31 temporarily stores the information in which the designated transmission destination and the message identification information are associated with each other into the storing unit 23.

FIG. 8 is a diagram showing an example of the header of E-mail data 50 generated by the E-mail generating unit 321. The header includes transmission time 51 of the E-mail data 50, E-mail address 52 of the designated transmission destination, E-mail address 53 of the data transmitting apparatus 1 as a transmission source, and peculiar message identification information 54 generated in association with the generation of the E-mail data 50. Consequently, on receipt of the E-mail data 50, the mail server 3 for receiving the E-mail data 50 and the computer 4 as a transmission destination can specify the transmission source of the E-mail data 50, so that an E-mail such as an error mail can be automatically returned to the transmission source.

The data attaching unit 322 attaches, as attachment data, image data obtained from the scanner 13 to the E-mail data 50 generated by the E-mail generating unit 321, thereby generating transmission data. The generated transmission data is supplied to the data transmitting/receiving unit 16a.

The data transmitting/receiving unit 16a transmits the E-mail having the designated E-mail address as a transmission destination to the mail server 3 on the basis of a control signal from the transmission control unit 312.

When the E-mail address 52 designated as a transmission destination is unknown (does not exist), the mail server 3 for receiving E-mails returns an error mail indicative of an address error to the E-mail address 53 as a transmission source. At this time, the mail server 3 adds the message identification information 54 included in the E-mail data 50 to the error mail in order to indicate the E-mail which cannot be transmitted to the transmission destination.

FIG. 9 is a diagram showing an example of an error mail 60 returned from the mail server 3 to the data transmitting apparatus 1. As shown in FIG. 9, the error mail 60 from the mail server 3 includes transmission time 61 of the error mail 60, E-mail address 62 of the data transmitting apparatus 1 as a destination of the error mail 60, E-mail address 63 of the mail server 3 as a sender of the error mail 60, message identification information 64 for specifying an E-mail in which an error occurs, and error kind information 65 indicative of the kind of the error. As the message identification information 64, the message identification information 54 included in the E-mail data 50 in which an error occurs is used as it is.

Therefore, when the data transmitting apparatus 1 receives the error mail from the mail server 3, by confirming the message identification information 64, the corresponding relation between the E-mail in which the error regarding the transmission destination occurs and the designated transmission destination can be clearly identified.

On receipt of the E-mail via the mail server 3, the computer 4 for receiving E-mails analyzes the image data attached to the E-mail. When the image data is image data which cannot be processed by the computer 4, the computer 4 returns the error mail indicative of an error regarding the image data to the E-mail address 53 as a transmission source. At this time, the computer 4 adds to the error mail the message identification information 54 included in the E-mail data 50 to indicate the E-mail which cannot be processed.

FIG. 10 is a diagram showing an example of an error mail 70 returned from the computer 4 to the data transmitting apparatus 1. As shown in FIG. 10, the error mail 70 from the computer 4 includes transmission time 71 of the error mail 70, E-mail address 72 of the data transmitting apparatus 1 as a destination of the error mail 70, E-mail address 73 of the computer 4 as a transmission source of the error mail 70 (that is, the transmission destination address 52 of the erroneous E-mail), message identification information 74 for specifying an E-mail in which an error occurs, and error kind information 75 indicative of the kind of the error. As the message identification information 74, the message identification information 54 included in the E-mail data 50 in which an error occurs is used as it is.

In this case as well, on receipt of the error mail from the computer 4 by the data transmitting apparatus 1, by confirming the message identification information 74, the corresponding relation between the E-mail in which the error regarding the image data occurs and the designated transmission destination can be clearly identified.

More specifically, when the data transmitting apparatus 1 receives an E-mail, the error determining unit 314 in the control unit 31 functions. By detecting the presence or absence of the error kind information 65 and 75 with respect to the received E-mail, the error determining unit 314 determines whether the received E-mail is an error mail or not. For example, when a character train of "ERROR" exists in the header or the main body, it is understand that the E-mail is an error mail. In the case where the E-mail is determined as an error mail, the error determining unit 314 specifies the E-mail in which an error occurs by obtaining the message identification information 64 and 74. By referring to the information in which the transmission destination stored in the storing unit 23 and the message identification information 54 are associated with each other, the occurrence of the error, the kind of the error, and the transmission destination can be associated with each other.

The error determining unit 314 accesses the storing unit 23 to obtain the transmission destination registration table D1, specifies the transmission destination in which the error occurs, and adds error information in association with the transmission destination. As a result, the error information is associated with the information regarding the transmission destination in the transmission destination registration table D1. When the user tries to send data to the same transmission destination again, the error information associated with the designated transmission destination is displayed on the display 12, so that the re-occurrence of the error can be prevented.

Each of the processing operation at the time of data transmission and the processing operation at the time of data reception in the data transmitting apparatus 1 with the above configuration will be described hereinbelow with reference to a flowchart.

Figure 11:
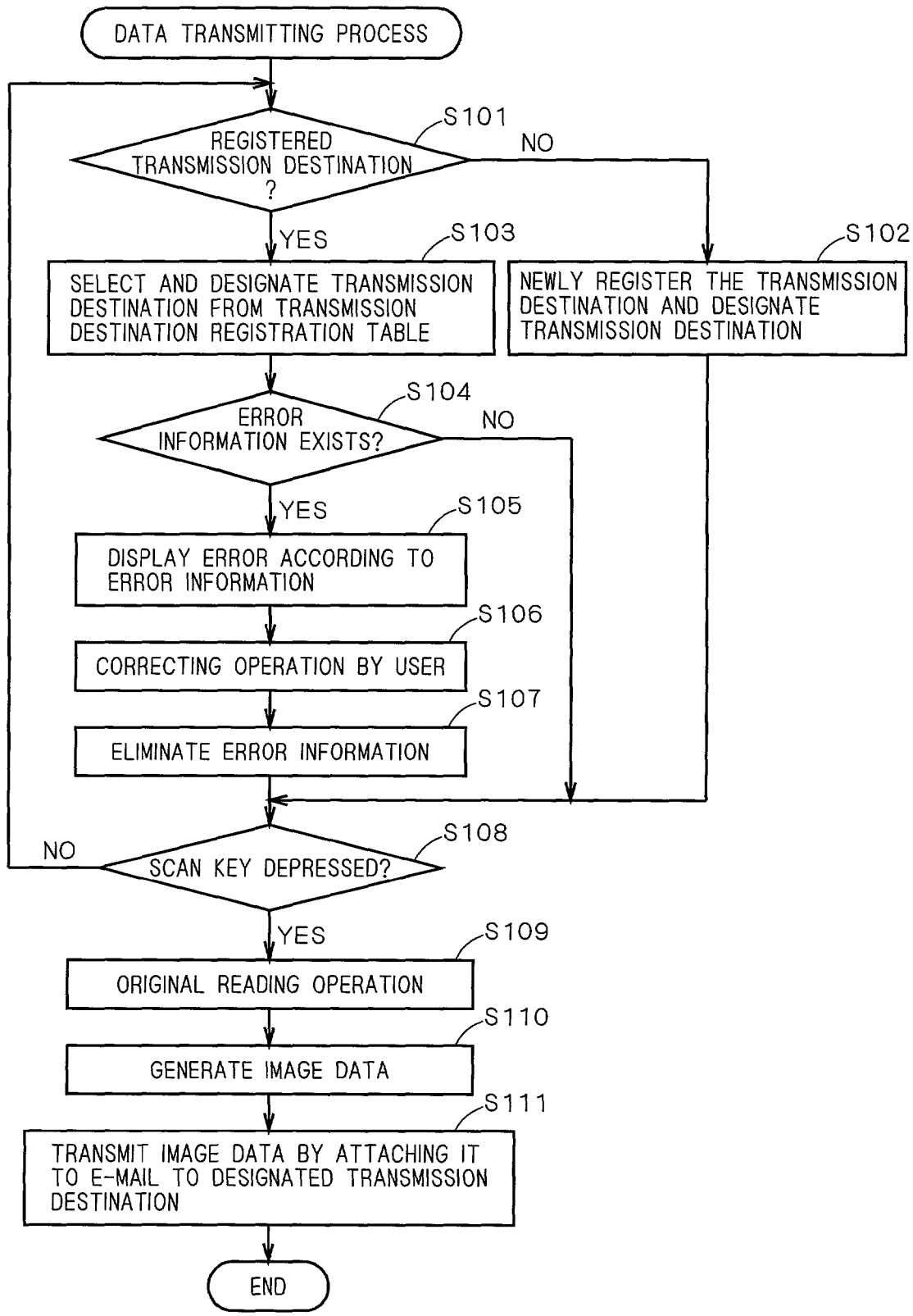
FIG. 11 is a flowchart showing processing operation at the time of data transmission.

First, the process at the time of data transmission will be described. FIG. 11 is a flowchart showing the processing operation at the time of data transmission in the data transmitting apparatus 1.

At the time of data transmission, first, the transmission destination is selected and designated by the user (step S101). At the time of designating the transmission destination by the user, in the case of selecting and designating the transmission destination from the transmission destination registration table D1 stored in the storing unit 23, the program advances to step S103. In the case of designating a new transmission destination which is not yet registered in the transmission destination registration table D1, the program advances to step S102.

In step S102, the user enters information regarding a new transmission destination by using the operation panel 10, and the control unit 31 adds the information regarding the new transmission destination to the transmission destination registration table D1 on the basis of the input information and designates the transmission destination on the basis of the information regarding the input transmission destination. At this time, the transmission conditions are also entered. When the user enters the transmission conditions such as the read resolution and the format of the image data, the information is registered as the transmission condition registration information in association with the new transmission destination into the transmission destination registration table D1. The entry of the transmission conditions is not always necessary.

In step S103, the control unit 31 displays, on the display 12, a list of transmission destinations registered in the transmission destination registration table D1, and accepts the selection and designation of the transmission destination by the user.

When the user selects and designates the transmission destination, the control unit 31 determines whether error information is registered or not with respect to the transmission destination designated in the transmission destination registration table D1 (step S104). In the case where the error information is registered, the program advances to step S105. In the case where the error information is not registered, the program advances to step S108.

In step S105, the display control unit 313 obtains error information associated with the selected transmission destination, and displays an error message according to the error information on the display 12 (refer to FIGS. 4 to 7). By the error message displayed, the user recognizes the occurrence of the error, and necessity of correction of the information of the transmission destination and the information regarding the transmission condition, and performs the correcting operation as necessary via the operation panel 10 in step S106.

When the correcting operation is performed by the user, the control unit 31 registers the corrected data to the transmission destination registration table D1 to thereby update the contents of the transmission destination registration table D1. It can be also considered that the cause of the error is solved by the correction of the transmission destination or the transmission condition by the user, it is necessary to avoid displaying the same error message. Consequently, after the correcting operation is performed by the user, the control unit 31 eliminates the error information stored in the transmission destination registration table D1 in association with the designated transmission destination (step S107) and the program advances to step S108.

The control unit 31 determines whether a scan key included in the operation unit 11 of the operation panel 10 is depressed by the user or not. If "YES", the program advances to step S109. If "NO", the program returns to step S101 to accept a change in the transmission destination or the like.

When the scan key is depressed, the control unit 31 makes the automatic original feeder 17 and the scanner 13 operate simultaneously to start the operation of reading an original (step S109). At this time, in the case where the transmission condition registration information is associated with the designated transmission destination, the control unit 31 sets reading conditions of the scanner 13 or the like on the basis of the information regarding the transmission conditions.

In the data transmitting apparatus 1, image data is generated (step S110). The transmission data generating unit 32 functions to perform a process of attaching image data obtained by reading an original to an E-mail, and the E-mail to which the image data is attached is transmitted to the designated transmission destination (step S111).

It finishes the process of the data transmission. When the user designates the transmission destination and the error information is associated, attention of the user is attracted by the display of the error message. After the user counters the error as necessary, an original reading process (step S109), an image data generating process (step S110), and a transmitting process (step S111) are performed, so that the possibility of re-occurrence of the same error can be reduced.

Figure 12:
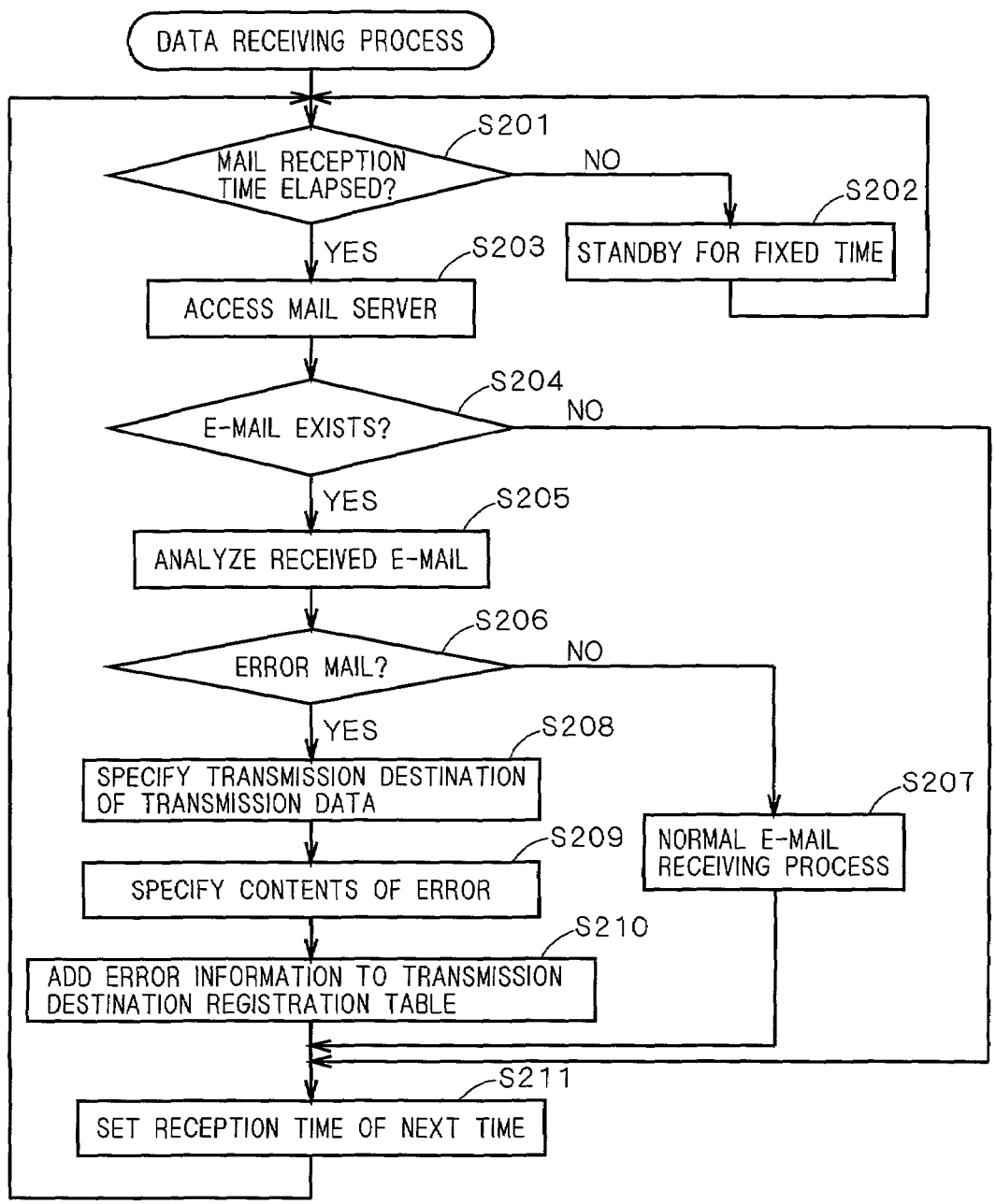
FIG. 12 is a flowchart showing processing operation at the time of data reception.

The process at the time of data reception will now be described. FIG. 12 is a flowchart showing the processing operation at the time of data reception in the data transmitting apparatus 1.

Since the reception state of E-mails has to be checked every predetermined period, the control unit 31 determines whether the mail reception time has elapsed or not (step S201). In the case where the mail reception time has not been elapsed, the control unit 31 waits for predetermined time in step S202. After that, whether the mail reception time has elapsed or not is checked again (step S201).

In the case where the mail reception time has elapsed, the control unit 31 accesses the mail server 3 via the data transmitting and receiving unit 16a (step S203), and determines whether an E-mail addressed to itself exists or not (step S204). If "YES", the program advances to step S205. If "NO", the program advances to step S211 where the reception time of next time is set. After that, the program returns to step S201, and the control unit 31 enters a mail reception standby mode.

When an E-mail addressed to itself is received, the control unit 31 analyzes the E-mail (step S205) and determines whether the received E-mail is an error mail or not (step S206). If it is an error mail, the program advances to an error process for processing the error mail (steps S208, S209, and S210). If it is an normal E-mail other than an error mail, a normal E-mail receiving process (step S207) is performed. The normal E-mail receiving process (step S207) includes a process of receiving E-mail data to which image data is attached and performing a printing process based on the image data.

In the case of performing the error process, the error determining unit 314 specifies the transmission destination of the transmission data in which an error occurs from the message identification information included in the error mail (step S208). The error kind information 65 and 75 (refer to FIGS. 9 and 10) is analyzed to specify the kind of the error (step S209). After that, the control unit 31 additionally registers error information to the transmission destination registration table D1 so as to be associated with the specified transmission destination (step S210). By adding the error information to the transmission destination registration table D1 on receipt of the error mail, when the user designates the transmission destination in which an error occurs and performs the data transmitting process after that, a message based on the error information can be displayed (step S105 in FIG. 11).

The reception time of next time is set (step S211), the program returns to step S201, and a mail reception standby mode is set.

As described above, the data transmitting apparatus 1 is constructed so as to store at least one transmission destination in the storing unit 23. At the time of data transmission, the user designates a desired transmission destination from at least one transmission destination stored in the storing unit 23. Further, the data transmitting apparatus 1 is constructed so that, when data transmission by an E-mail becomes error, the transmission destination designated at the time of data transmission and error information indicative of the occurrence of an error are stored so as to be associated with each other into the storing unit 23. After that, when the user performs an operation of designating the transmission destination, the presence or absence of error information is checked by referring to the storing unit 23. If error information exists, occurrence of an error with respect to the transmission destination with which the error information is associated is notified. Therefore, in the data transmitting apparatus 1, in the case of transmitting data to the transmission destination in which a transmission error occurred in the past, attention of the user is attracted by displaying an error message. Thus, it can be effectively prevented that an E-mail having the same conditions as those of an E-mail in which a transmission error occurs is repeatedly transmitted.

The data transmitting apparatus 1 is also constructed so as to change data displayed on the display 12 in accordance with the kind of an error corresponding to the error information, so that the user can know not only the occurrence of the error but also the kind of the error and a countermeasure according to the kind.

<3. Modification>

Although the preferred embodiment of the invention has been described above, the invention is not limited to the contents of the above description.

For example, although the example of notifying of occurrence of an error when the user designates a transmission destination has been described above, an error notification is not limited to the timing when the transmission destination is designated. For instance, when the user performs an operation of confirming the contents registered in the transmission destination registration table D1, occurrence of the error and the like may be notified. Specifically, the timing of displaying an error is not limited to that when the user designates the transmission destination associated with the error information. Alternately, an error message may be displayed when a predetermined operation regarding the transmission destination such that the data stored in the storing unit 23 is displayed and any of the transmission destinations registered in the transmission destination registration table D1 is confirmed. As such a case, for example, an operation of maintaining the transmission destination registration table D1 can be mentioned, such that the E-mail address of the transmission destination registered in the transmission destination registration table D1 is corrected in association with a change in the E-mail address of a predetermined transmission destination. In this case, in response to the operation of displaying the data registered in the transmission destination registration table D1 for correcting the transmission destination information, the data transmitting apparatus 1 checks not only the transmission destination to be corrected but also checks whether error information exists or not with respect to all of transmission destinations registered in the transmission destination registration table D1. If the error information exists, a corresponding one of FIGS. 4 to 7 is displayed according to the kind of the error information.

Although the form of displaying a message on the display 12 as means for notifying of occurrence of an error to the user has been described above, the invention is not limited to the form. The occurrence of the error may be notified by using other notifying means such as buzzer, sound, and the like. Although both the error occurrence message and the error counting message (such as the message G12 in FIG. 4) are displayed in the above description, it is also possible to simply display the error occurrence message.

Although the case of transmitting/receiving data by using an E-mail has been described above as an example, obviously, the invention can be applied to other arbitrary communication methods such as a facsimile.

Although the case where the data transmitting apparatus 1 is a composite apparatus has been described above, the invention is not limited to the composite apparatus. For example, an apparatus having a single function such as a scanner, a copier, or a facsimile apparatus or other apparatus may be used. For example, a personal computer as an E-mail terminal, a portable telephone having the data transmitting function, or the like may be used.

Further, in the preferred embodiment, only one kind of error information is stored per transmission destination in the transmission destination registration table D1. When an error occurs for composite reasons in a single data transmission, it is possible to store a plurality of kinds of error information per transmission destination and an error message may be displayed by combining the messages of FIGS. 4 to 7 in accordance with the kinds of the error.

While the invention has been shown and described in detail, the foregoing description is in all aspects illustrative and not restrictive. It is therefore understood that numerous modifications and variations can be devised without departing from the scope of the invention.

What is claimed is:

1. A data transmitting apparatus comprising:

a storing unit for storing at least one transmission destination;

a transmitting unit for transmitting image data via e-mail to a designated transmission destination;

an error information storing unit, when receiving an error mail in response to data transmission performed by said transmitting unit, for analyzing error kind information included in said error mail by an information analyzing unit to identify the kind of error occurring during said data transmission among a plurality of types of errors including an error regarding a transmission destination and an error regarding image data, thereby storing error information indicative of said kind of error in association with said designated transmission destination into said storing unit; and a notification control unit, when a predetermined operation is performed by a user on said at least one transmission destination stored in said storing unit, for checking whether said error information exists or not by referring to said storing unit and, if said error information exists, notifying of an error occurrence notification indicative of said kind of error with respect to said at least one transmission destination associated with said error information, wherein said notification control unit also notifies the user of an error treatment notification with respect to said at least one transmission destination associated with said error information so as to stimulate the user to settle said error in accordance with said kind of error, said apparatus for transmitting data further comprises a display unit for displaying said error occurrence notification and said error treatment notification, and said notification control unit changes an information displayed on said display unit in accordance with said kind of error indicated by said error information.

2. The data transmitting apparatus according to claim 1, wherein said predetermined operation is an operation of selecting said designated transmission destination from said at least one transmission destination stored in said storing unit; and said notification control unit notifies of said error occurrence notification when said error information is associated with said designated transmission destination selected by said predetermined operation.

3. The data transmitting apparatus according to claim 1, wherein said predetermined operation is an operation of displaying data stored in said storing unit.

4. The data transmitting apparatus according to claim 1, wherein when said kind of said error is an error regarding said designated transmission destination, said notification control unit displays an information for stimulating the user to confirm contents stored in said storing unit with regard to said transmission destination corresponding to said kind of said error onto said display unit.

5. The data transmitting apparatus according to claim 1, wherein
when said kind of said error is an error regarding transmission data, said notification control unit displays an information for stimulating the user to review a capacity or format of data to be transmitted onto said display unit.

6. The data transmitting apparatus according to claim 1, wherein
said transmitting unit transmits data to said designated transmission destination by means of an electronic mail.

7. The data transmitting apparatus according to claim 6, wherein
said transmitting unit transmits data in a state where image data is attached to said electronic mail.

8. A method of transmitting data via e-mail, comprising the steps of:
(a) storing at least one transmission destination into a predetermined storing unit;
(b) transmitting image data via e-mail to a designated transmission destination;
(c) when receiving an error mail in response to data transmission performed in said step (b), analyzing error kind information included in said error mail by an information analyzing unit to identify the kind of error occurring during said data transmission among a plurality of types of errors including an error regarding a transmission destination and an error regarding image data, thereby storing error information indicative of said kind of error in association with said designated transmission destination into said storing unit; and
(d) when a predetermined operation is performed by a user on said at least one transmission destination stored in said storing unit, checking whether said error information exists or not by referring to said storing unit and, if said error information exists, notifying of an error occurrence notification indicative of said kind of error with respect to said at least one transmission destination associated with said error information, wherein
said step (d) also notifies the user of an error treatment notification with respect to said at least one transmission destination associated with said error information so as to stimulate the user to settle said error in accordance with said kind of error,
said step (d) further comprises the step of:
(d-1) displaying said error occurrence notification and said error treatment notification on a predetermined display unit, and
said step (d) changes an information displayed on said display unit in accordance with said kind of error indicated by said error information.

9. A computer program to be read and executed by a computer, for making said computer function as:
a control unit for causing a predetermined storing unit to store at least one transmission destination via e-mail;
a transmitting unit for transmitting data via e-mail to a designated transmission destination;
an error information storing unit, when receiving an error mail in response to data transmission performed by said transmitting unit, for analyzing said error mail by said computer to identify the kind of error occurring during said data transmission among a plurality of types of errors including an error regarding a transmission destination and an error regarding image data, thereby storing error information indicative of said kind of error in association with said designated transmission destination into said storing unit; and
a notification control unit, when a predetermined operation is performed by a user on said at least one transmission destination stored in said storing unit, for checking whether said error information exists or not by referring to said storing unit and, if said error information exists, notifying of an error occurrence notification indicative of said kind of error with respect to said at least one transmission destination associated with said error information, wherein
said computer program further causes:
said notification control unit to notify the user of an error treatment notification with respect to said at least one transmission destination associated with said error information so as to stimulate the user to settle said error in accordance with said kind of error,
said notification control unit to function as a display control unit for displaying said error occurrence notification and said error treatment notification on a predetermined display unit, and
said display control unit to change an information displayed on said display unit in accordance with said kind of error indicated by said error information.

10. The computer program according to claim 9, wherein
said predetermined operation is an operation for selecting said designated transmission destination from said at least one transmission destination stored in said storing unit; and
when said designated transmission destination selected by said predetermined operation is associated with said error information, said notification control unit is allowed to function so as to notify of said error occurrence notification.

11. The computer program according to claim 9, wherein said predetermined operation is an operation for displaying data stored in said storing unit.

12. The computer program according to claim 9, wherein
when said kind of said error is an error regarding said designated transmission destination, said display control unit is allowed to function so as to display an information for stimulating the user to confirm contents stored in said storing unit with regard to said transmission destination corresponding to said kind of said error onto said display unit.

13. The computer program according to claim 9, wherein
when said kind of said error is an error regarding transmission data, said display control unit is allowed to function so as to display an information for stimulating the user to review a capacity or format of data to be transmitted onto said display unit.

14. The computer program according to claim 9, wherein
said transmitting unit is allowed to function so as to transmit data to said designated transmission destination by means of an electronic mail.

15. The computer program according to claim 14, wherein
said transmitting unit is allowed to function so as to transmit data in a state where image data is attached to said electronic mail.

16. A computer-readable recording medium in which software programs are recorded, said software programs controlling a computer to obtain a system for data transmission, said system comprising:
a control unit for causing a predetermined storing unit to store at least one transmission destination via e-mail;

a transmitting unit for transmitting data via e-mail to a designated transmission destination;

an error information storing unit, when receiving an error mail in response to data transmission performed by said transmitting unit, for analyzing said error mail by said computer to identify the kind of error occurring during said data transmission among a plurality of types of errors including an error regarding a transmission destination and an error regarding image data, thereby storing error information indicative of said kind of error in association with said designated transmission destination into said storing unit; and a notification control unit, when a predetermined operation is performed by a user on said at least one transmission destination stored in said storing unit, for checking whether said error information exists or not by referring to said storing unit and, if said error information exists, notifying of an error occurrence notification indicative of said kind of error with respect to said at least one transmission destination associated with said error information, wherein said notification control unit notifies the user of an error treatment notification with respect to said at least one transmission destination associated with said error information so as to stimulate the user to settle said error in accordance with said kind of error, said notification control unit functions as a display control unit for displaying said error occurrence notification and said error treatment notification on a predetermined display unit, and said display control unit changes an information displayed on said display unit in accordance with said kind of error indicated by said error information.

\* \* \* \* \*